A. H. DE VOE.
LOOPER MECHANISM FOR SEWING MACHINES.
APPLICATION FILED DEC. 17, 1918.
1,386,322.
Patented Aug. 2, 1921.
6 SHEETS—SHEET 3.
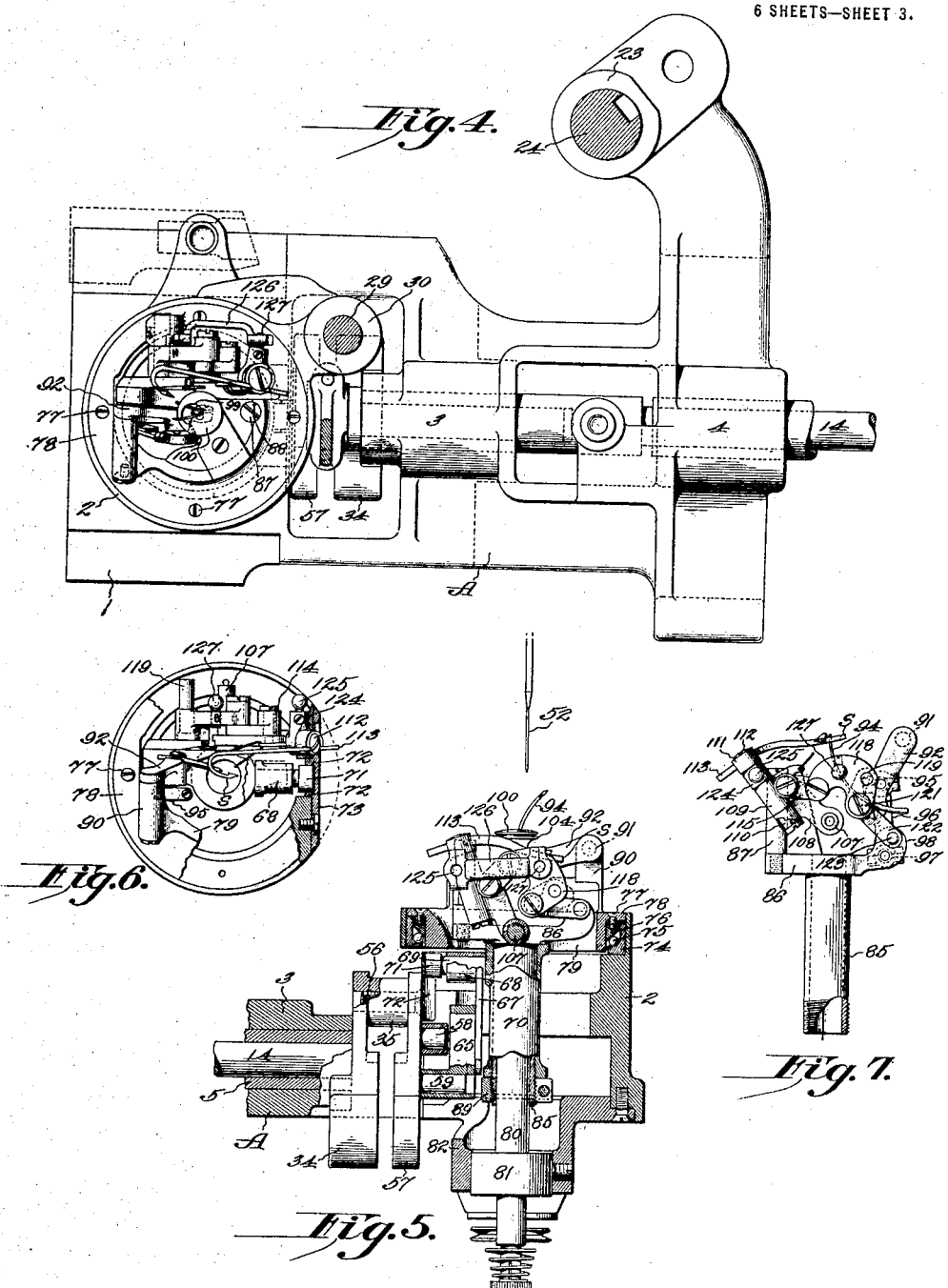
WITNESSES:
INVENTOR
BY
ATTORNEY A. H. DE VOE.
LOOPER MECHANISM FOR SEWING MACHINES.
APPLICATION FILED DEC. 17, 1918.
1,386,322.
Patented Aug. 2, 1921.
6 SHEETS—SHEET 4.
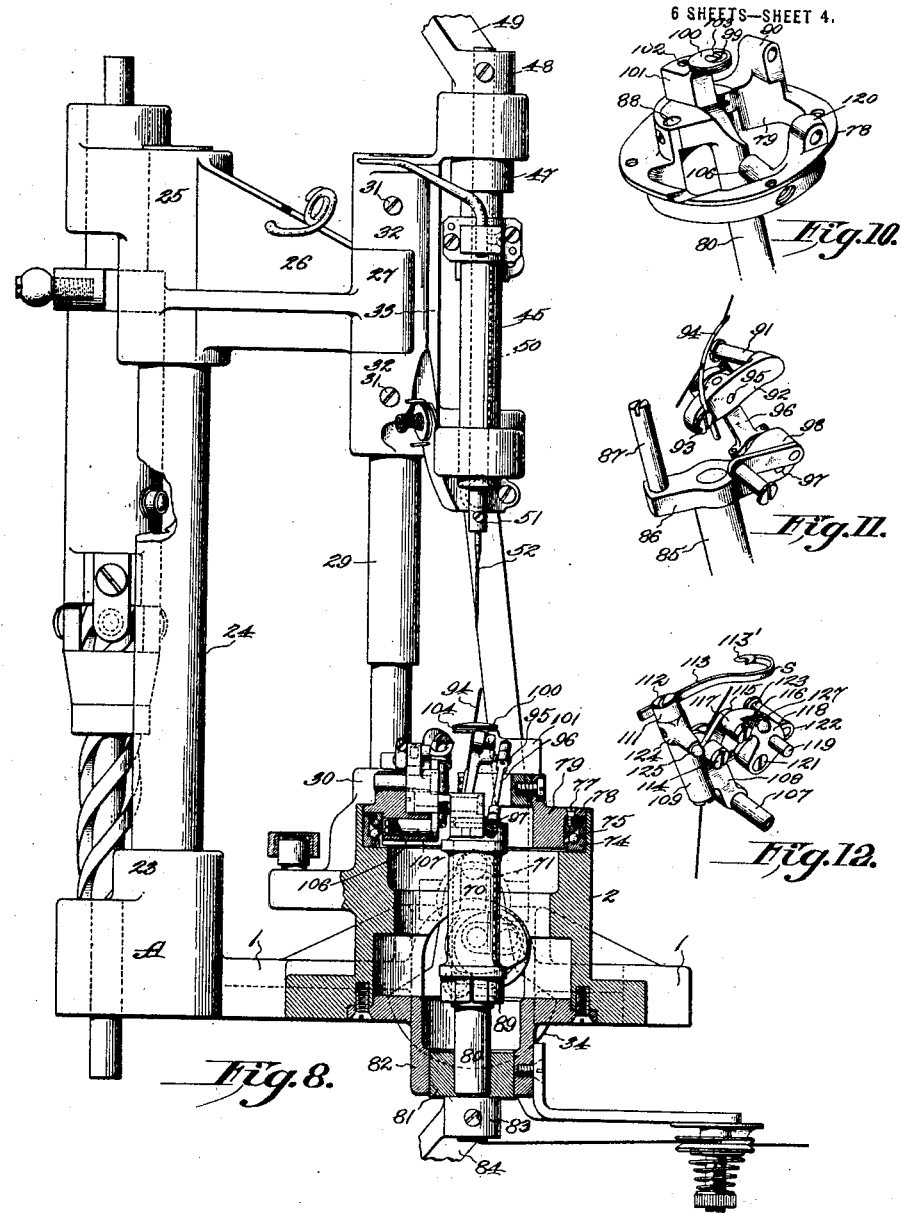
WITNESSES:
INVENTOR
BY
ATTORNEY

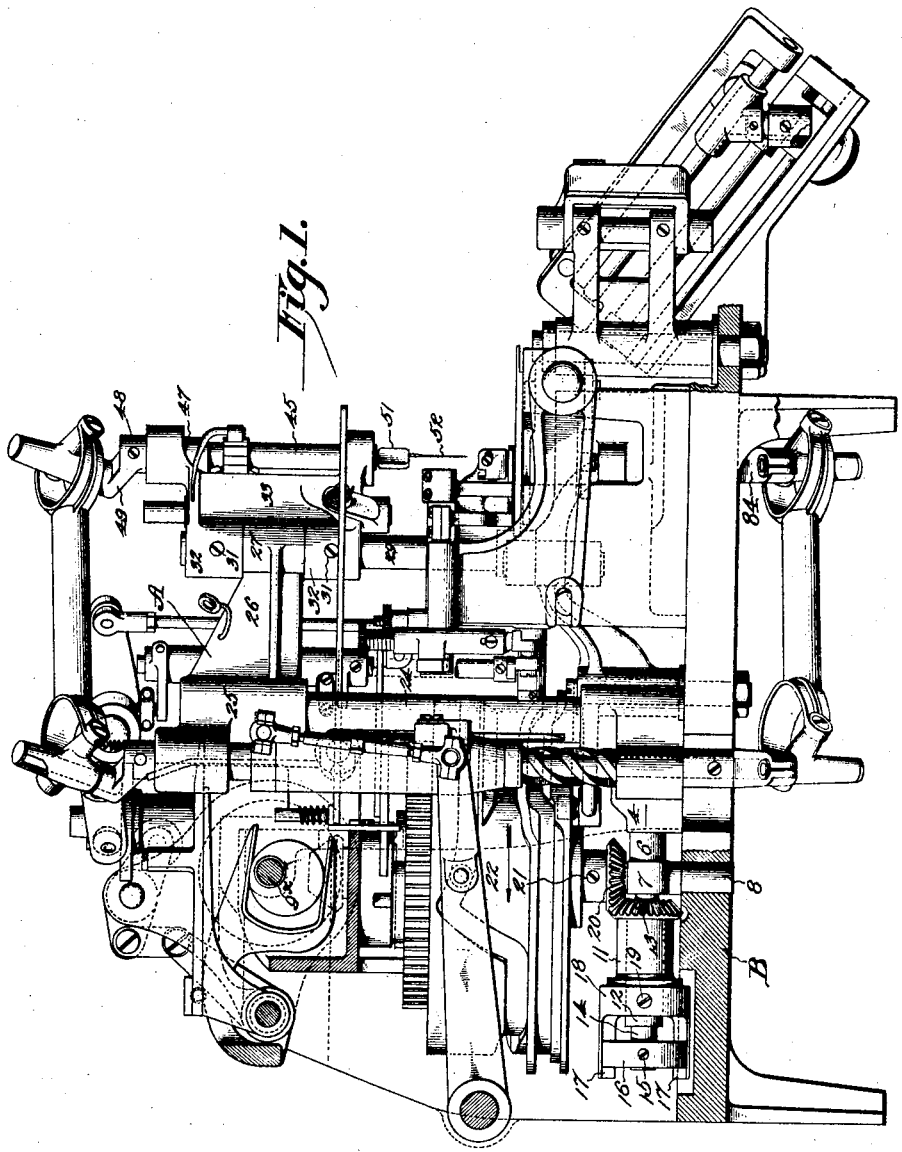

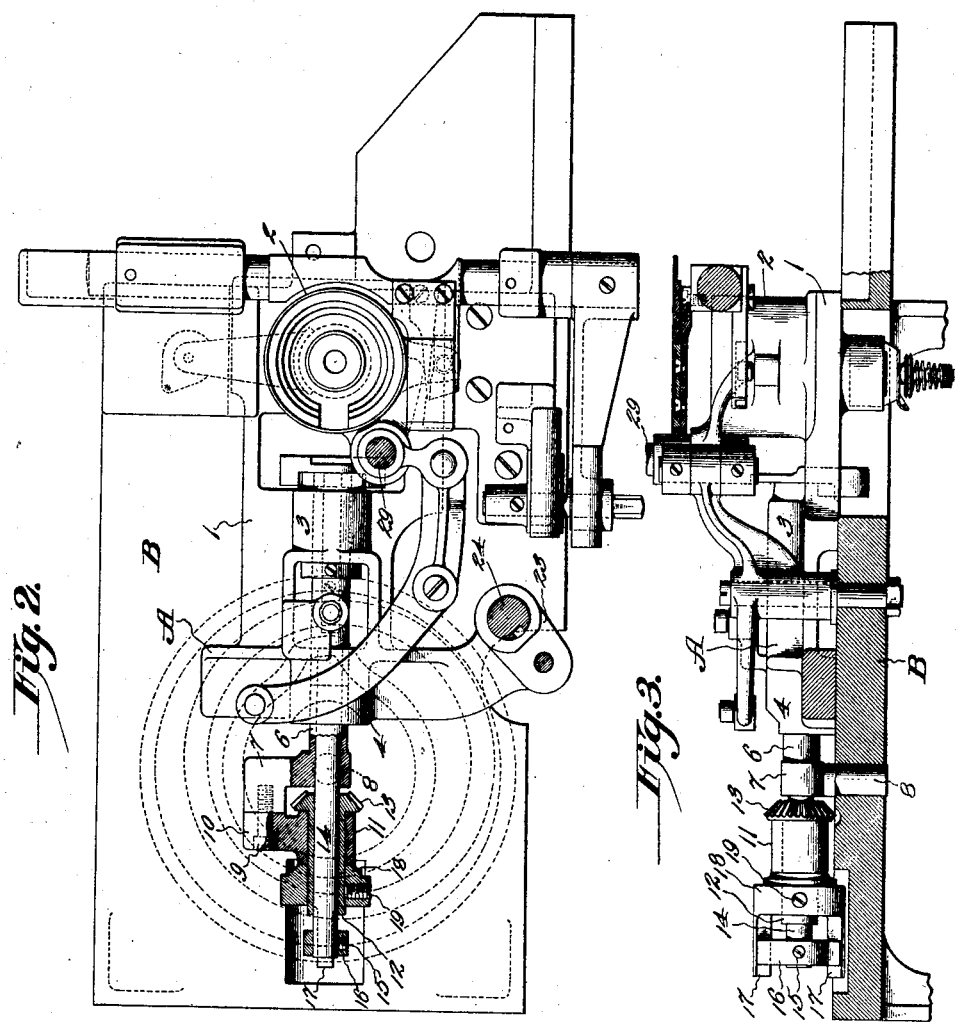

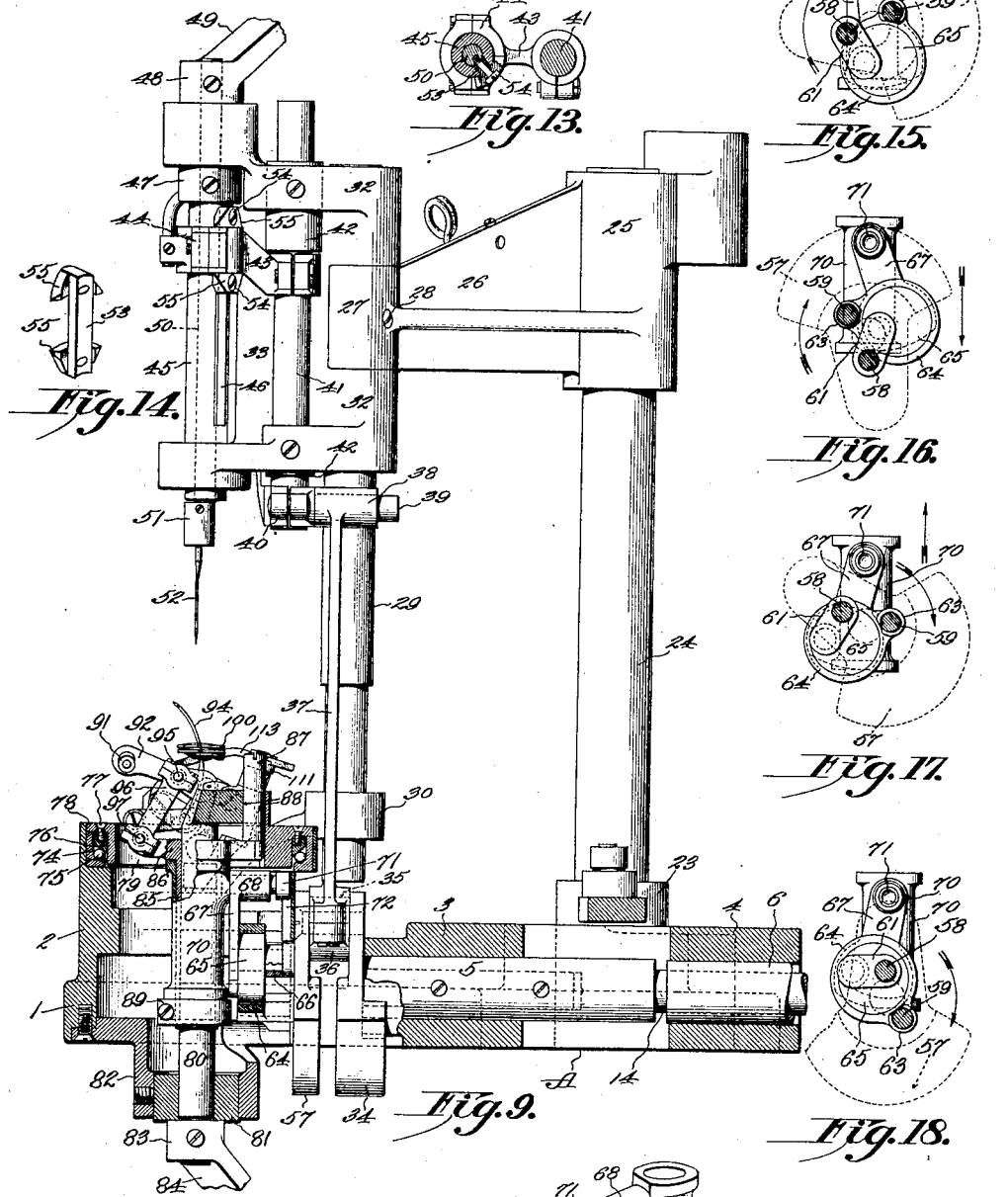

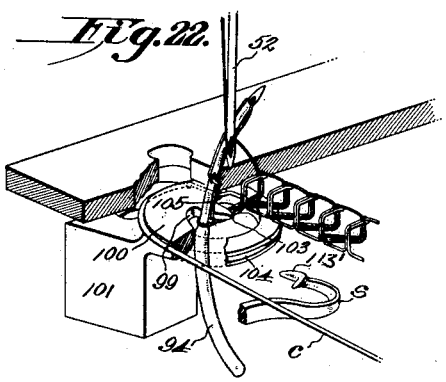
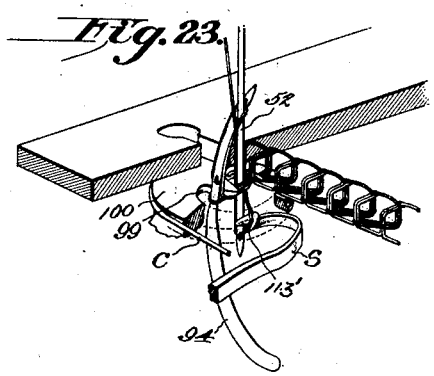
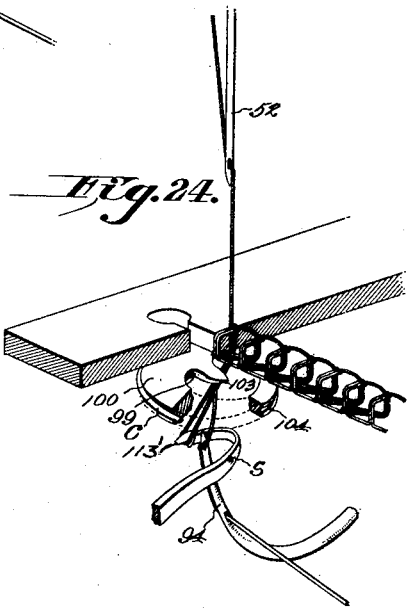
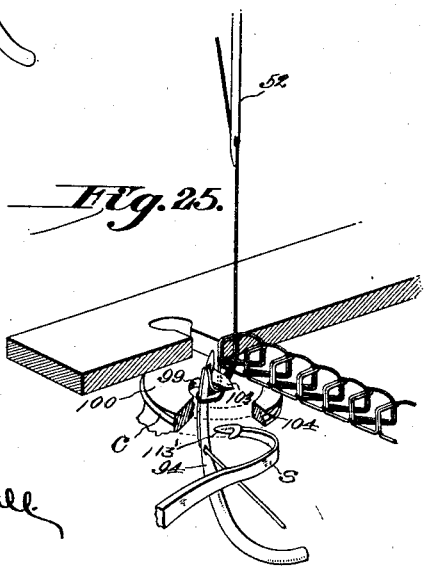

UNITED STATES PATENT OFFICE.

ALBERT H. DE VOE, OF WESTFIELD, NEW JERSEY, ASSIGNOR TO THE SINGER MANUFACTURING COMPANY, A CORPORATION OF NEW JERSEY.

LOOPER MECHANISM FOR SEWING-MACHINES.

1,386,322.　　　　Specification of Letters Patent.　　Patented Aug. 2, 1921.

Original application filed December 31, 1915, Serial No. 69,644. Renewed January 7, 1921, Serial No. 435,761. Divided and this application filed December 17, 1918. Serial No. 267,103.

*To all whom it may concern:*

Be it known that I, ALBERT H. DE VOE, a citizen of the United States, residing at Westfield, in the county of Union and State of New Jersey, have invented certain new and useful Improvements in Looper Mechanisms for Sewing-Machines, of which the following is a specification, reference being had therein to the accompanying drawings.

This invention relates to looper mechanism for sewing machines and has for an object to provide a simple, durable, efficient and quiet running mechanism for giving to the looper its required motions.

In the preferred embodiment of the invention, the looper mechanism is particularly adapted for use in the buttonhole sewing machine disclosed in my copending application Serial No. 69,644, filed December 31, 1915, of which this application is a division. It is to be understood, however, that the present looper mechanism is useful in various other types of sewing machines, as will be apparent to those skilled in the art.

The invention comprises essentially a looper mounted for bodily endwise and sidewise movements and actuating means including a toggle device for imparting to the looper one of its movements and a connection between an element of said toggle device and the looper for imparting to the latter the other of said movements. The invention further comprises certain details of construction and combinations of parts hereinafter described and pointed out in the appended claims.

A better understanding of the invention may be had by referring to the following description taken in connection with the accompanying drawings, in which Figure 1 is a side elevation of the machine. Figs. 2 and 3 are respectively a plan and elevation, partly in section, representing the machine bed, the stitching frame, and a portion of the feeding mechanism. Fig. 4 is a plan of the stitch-frame and the looper-mechanism with its actuating means. Fig. 5 is a sectional elevation representing the looper-mechanism. Fig. 6 is a plan of the looper-mechanism and its supporting turret detached from the machine. Fig. 7 is an elevation of the same with certain parts omitted. Fig. 8 is an elevation taken from the front of the machine and representing the stitch frame and the stitch-forming mechanism. Fig. 9 is a similar view of the same parts taken from the side of the machine opposite that shown in Fig. 1. Figs. 10, 11 and 12 are perspective views respectively of the turret sustaining the looper-mechanism, the lower thread carrying needle with its supporting and actuating means, and the spreader or looper with its supporting and actuating means. Fig. 13 is a cross-section of the needle-bar and needle-actuating bar with their connections. Fig. 14 is a perspective view of certain parts of the latter. Figs. 15, 16, 17 and 18 are transverse sectional views showing certain parts of the looper-actuating mechanism in different operative positions. Figs. 19, 20 and 21 are perspective views representing said parts detached, and Figs. 22, 23, 24 and 25 are perspective views showing diagrammatically the stitch-forming elements in different stages of a stitch-forming cycle and a portion of an edge-covering seam as applied, for example, to the margin of a buttonhole slit formed in the fabric.

In the preferred embodiment of the invention, as illustrated, the looper mechanism, as well as the needle mechanism, is mounted in a traveling stitch-frame A mounted in the main-frame of the machine, as disclosed in my said copending application.

The stitch-frame A comprises the base-plate 1, Figs. 2 and 3, having at one end the upwardly extending cylindrical curb or casing 2 for the looper mechanism and rearward thereof the longitudinally extending bearings 3 and 4. The bearing 3 is provided with the bushing 5, Fig. 5, and the bearing 4 has slidably fitted within it the tubular bearing boss 6, Fig. 2, of a bracket 7 which is formed with a depending fulcrum stud 8, Fig. 3, journaled within a suitable bearing aperture in the bed-plate B of the main or stationary frame of the machine. The bracket 7, Fig. 2, has secured to it by the screw 9 an arm 10 of a bearing sleeve 11 in which is journaled the tubular hub 12 of a bevel pinion 13.

The stitch-forming mechanism is driven by means of the crank-shaft 14, Figs. 2, 3, 5 and 9, which is journaled in the bushing 5 and the bearing boss 6. This shaft passes through the hub 12 of the gear 13 and has secured upon its end by the set screw 15 the cross-bar 16 notched in its ends to fit the diametrically opposite and parallel guiding pins 17 formed upon the collar 18 which is secured by means of the set screw 19 upon the gear hub 12 and, with the gear 13, embraces the bearing sleeve 11 to confine the gear against axial movement while the shaft 14 is permitted to move endwise freely. The collar 18 and cross-bar 16 obviously provide a sliding driving connection between the gear-hub 12 and the shaft 14.

Meshing with the bevel-pinion 13 is a similar pinion 20, Fig. 1, having its hub fixed by the set-screw 21 to the lower end of an intermediate shaft journaled in a suitable bearing bushing of the feed-wheel 22 and driven through a one-to-two speed multiplying connection with the main or sewing shaft $9^x$, as fully described in my said copending application. The shaft $9^x$ receives power during stitching periods from a belt driven pulley through a suitable clutch mechanism also fully described in my said copending application.

Rigidly secured in a boss 23, Figs. 4 and 8, of the base-plate 1 is a standard 24 having secured upon its upper end the hub 25 of an overhanging bracket-arm 26 formed at its free end with a boss 27 in which is secured by a set-screw 28, Fig. 9, the depending post 29 with its reduced lower portion entering an apertured bearing boss 30 sustained by the casing 2. Secured upon the post 29 by set-screws 31 upon opposite sides of the boss 27 are the spaced hubs 32 of the needle-bar frame 33 sustaining the needle mechanism. From the foregoing it will be readily understood that the stitch frame is free to slide longitudinally with the shaft 14 and may also swing with the shaft 14 about the fulcrum-stud 8 as an axis.

For the purposes of the present disclosure it is deemed unnecessary to describe the connections with the feed-wheel 22 for imparting to the stitch-frame its traveling or stitch-positioning movements relative to the work as in sewing around a buttonhole. These connections are fully described in my said copending application.

The shaft 14, Fig. 9, is formed at its forward end with a crank-plate 34 formed with the crank-stud 35 which is embraced by a strap 36 at the lower end of a pitman-rod 37 having at its upper end the apertured boss 38 entered by a stud 39 projecting from a split collar 40 which is clamped upon the reciprocating bar 41 journaled in suitable bushings 42 of the needle-frame 33. Secured upon the bar 41 is the split hub at one end of a rigid lateral arm 43 having upon its opposite end a split boss 44 loosely embracing a rotary tubular bushing 45 formed in one side with a longitudinal slot 46 and journaled within bearing bosses of the needle-frame parallel with the bar 41. The bushing 45 is confined against endwise movement by a collar 47 secured thereon below its upper bearing boss and the hub 48 of an inclined crank-arm 49 secured thereon above said bearing boss.

Journaled within the bushing 45 is the reciprocating needle-bar 50 carrying at its lower end the needle-clamp 51 having an eccentrically disposed socket in which is secured the eye-pointed needle 52. Fitted within the longitudinal slot 46 of the bushing 45 is a spline 53 secured to the needle-bar by screw 54 and provided upon the outer face with projecting lugs 55 embracing between them the collar 44. Through the described connections, the rotation of the crank-stud 35 with the crank-shaft 14 effects the reciprocation of the needle-bar and needle which are caused to turn with the surrounding bushing 45 when the crank 49 is turned. As will be observed by reference to Fig. 9, the connections between the intermediate bar 41 and the needle-bar and the pitman-rod, respectively, are upon opposite sides of the intermediate bar and extend laterally to such extent that a sufficient clearance is provided between the needle and the pitman-rod to accommodate the margin of the work in which the buttonholes are formed.

Secured to the crank-stud 35 by the screw 56, Fig. 5, is a second crank-plate 57 adapted to rotate with the crank-shaft 14 and provided upon its forward end with the looper-actuating crank-pins 58 and 59 arranged nearly diametrically apart (Figs. 15 to 18 inclusive). The crank-pin 58 enters an aperture in the boss 60 at one end of a link 61 having at its opposite end the stud 62 (Fig. 21) and the crank-pin 59 enters an aperture in the boss 63 at one side of the eccentric strap 64. The eccentric strap and its apertured boss together constitute a short link.

The eccentric strap 64 is fitted upon a boss 65 having the apertured boss 66 entered by the stud 62 of the link 61, said boss being formed upon the lower end of a pitman 67 having at its opposite end the apertured boss 68. The boss 68 is entered by a stud 69 extending laterally from the upper end of a sleeve 70 and carrying an anti-friction roller 71 which enters a guideway between two parallel ribs 72 upon a plate 73 affording a closure for the vertically slotted inner side of the casing 2, (Fig. 6). By the movement of the roller 71 within its guideway the upper end of the pitman 67 is movable only in a rectilinear path and the sleeve 70 is prevented from turning upon its axis.

The upper end of the casing 2 is cut out to form an annular seat in which is introduced a ring 74 formed with an annular race to receive the anti-friction balls 75 upon which rests the conical face of a wearing ring 76 which is secured by screws 77 to the peripheral flange 78 of the rotary turret 79 from which depends the axial shaft 80 (Figs. 5, 8 and 10) journaled near its lower end in the bushing 81 secured in the depending boss 82 of the casing 2. Secured to the reduced lower end of the shaft 80 is the hub 83 of an inclined crank-arm 84 by which the turret is confined to and turned upon its bearing.

Slidingly mounted upon the shaft 80 is a tubular actuating rod 85 provided with a transverse head 86 carrying a guide-pin 87 entering an aperture 88 of the turret. The sleeve 70 is loosely fitted upon the rod 85 and is confined between its head 86 and a split thrust-collar 89 applied to its threaded lower end, whereby the reciprocatory movements of the sleeve derived from the crank-shaft 14 are communicated to the tubular rod 85. The turret 79 is provided at one side with an upwardly extending bearing boss 90 having a slight downward inclination to receive the fulcrum-stud 91 of the vibrating lower needle-arm 82 which is formed in one face at its free end with a groove in which is clamped by means of the head 93 of a fastening screw the shank of the curved lower needle 94 which is shown provided near its point and intermediate the same and the shank with thread-eyes (Fig. 11).

The needle-arm 92 is provided intermediate its ends with a lateral ball-stud 95 which is embraced by a strap at the upper end of a pitman 96 having at its opposite end a similar strap which embraces a ball-stud 97 sustained by an upwardly extending boss 98 upon the head 86 of the actuating rod 85, the vertical movements of which communicate to the lower needle endwise movements in a circular path and in a plane slightly inclined to the path of movement of the upper needle 52. The lower needle reciprocates through the U-shaped needle-aperture 99 of the needle-throat 100 which is upwardly and inwardly offset from a block 101 secured by means of a screw 102 upon a flat seat upon the top of the turret. The U-shaped form of the aperture produces a tongue 103 serving as a loop-detainer for the upper thread loops around the lower needle. By virtue of the double crank drive illustrated in Figs. 15 to 18, inclusive, the actuator-sleeve 70 is given a variable motion of a character such as to cause the curved needle 94 to ascend rapidly, then dip sufficiently to throw out a loop, then dwell until the upper needle enters said loop, and then descend rapidly to the lower limit of its stroke.

The needle-throat is shown formed with a peripheral groove 104, Fig. 22, to receive a cord or gimp C which is led to the needle-aperture through a transverse hole 105 extending from the periphery into one end of the needle-aperture.

Journaled within a bearing boss 106, Fig. 8, extending inwardly from the rim of the turret is a stud 107 projecting laterally from a swinging arm 108, Fig. 12, having at one edge the tubular socket 109. Journaled within this socket is a pin 110, Fig. 7, formed with a head 111 having a transverse seat upon which is secured by means of the head of the clamp-screw 112 the shank 113 of the spreader s having its outer portion U-shaped, Fig. 6, and provided at its extremity with the shouldered loop-seizing beak 113', Fig. 12.

The arm 108 carries a screw-stud 114 embraced by one end of a link 115 carrying at its opposite end a screw-stud 116 which is embraced by an apertured boss 117 upon one arm of an elbow-lever 118 fulcrumed upon the stud-pin 119 which is secured in the suitably apertured bearing boss 120 of the turret. Another arm of the elbow-lever is pivotally connected by means of the screw-pin 121 with one end of a link 122 having upon its opposite end the screw-stud 123 which is journaled within a second bearing aperture of the boss 98 of the head 86 of the actuating rod 85.

The pin 110, Fig. 7, has secured thereon adjacent the head 111 a collar 124 having a crank-arm carrying a ball-stud 125 which is embraced by a strap at one end of a bent link 126 (Fig. 4) which has at its opposite end a strap embracing a ball-stud 127 carried by the lateral arm of the elbow-lever 118 intermediate the screw-stud 116 and the fulcrum-stud 119. In the rectilinear reciprocation of the actuating rod 85, the elbow-lever 118 receives rocking movements through the link 122. These movements are communicated to the looper carrying arm 108 through the link 115 which, with the connected arm of the elbow-lever forms a toggle device which is straightened as the looper approaches advance position, where it is given a dwell in contrast with the rapid reversal of its movement when in retracted position.

By reason of the described link-and-crank connection between the rocking looper or spreader carrying pin 110 and the elbow-lever, the continued movement of the latter during the dwell of the vibratory movement of the former produces an oscillatory movement of such pin, and hence a lateral swinging movement of the looper upon the pin 110 as a fulcrum to bring that part of the spreader-blade immediately behind its loop-restraining shoulder close to the path of movement of the lower needle (Figs. 24 and 25), in order to hold the loop for passage of the lower needle. As the needle-thread loop is carried by the looper beneath the needle-throat loop-stripping tongue 103, it is detained against being carried frictionally upon the needle-blade 94 through the buttonhole slit, and being thereby restrained against excessive distension in the stitch-forming operation.

Having thus set forth the nature of the invention, what I claim herein is—

1. In a sewing machine, in combination with a needle, a looper mounted for bodily endwise and sidewise movements, means including a toggle-device for imparting to the looper one of said movements, and a connection between an element of said toggle device and the looper for imparting to the latter the other of said movements.

2. In a sewing machine, in combination with a needle, a looper mounted for bodily endwise and sidewise movements, a rocking element, and independent links operatively connected with said looper and pivotally attached respectively to said rocking element at points circularly spaced apart relatively to the axis of motion of said rocking element.

3. In a sewing machine, in combination with a looper, a vibratory carrier upon which said looper is pivotally mounted, and looper-actuating means including a toggle device having one of its component elements operatively connected with said carrier, and a link connection between the other element of said toggle device and the looper independent of said carrier.

4. In a sewing machine looper mechanism, in combination, a looper, a shaft provided with two crank elements, a pitman connected to said looper, and independent driving connections between said crank-elements and said pitman.

5. In a sewing machine looper mechanism, in combination, a looper, a shaft provided with two crank-elements circularly spaced apart a distance less than a semi-circumference, a pitman connected to said looper, and independent driving connections between said crank-elements and said pitman.

6. In a sewing machine looper mechanism, in combination, a reciprocating element, a shaft provided with two circularly spaced crank elements, a pitman connected with said reciprocating element, and independent link connections between said pitman and said crank-elements, respectively.

7. Looper mechanism for buttonhole sewing machines comprising, a rotary turret, a looper-carrier movably mounted upon said turret, a looper movably mounted on said looper-carrier, a lever fulcrumed on said turret, a link connection between said lever and looper-carrier, said lever and link forming a toggle device, a second link connecting said lever with said looper for moving the latter relatively to the looper-carrier, and an actuator reciprocating vertically within the turret and operatively connected to said lever.

8. In a buttonhole sewing machine, in combination, a rotary turret, a looper-carrier pivoted horizontally on said turret, a looper pivoted upon said looper-carrier, a pair of pitmen connected respectively to said looper and looper-carrier, a vertically reciprocating looper-actuator, and actuating connections between said actuator and said pitmen.

9. In a buttonhole sewing machine, the combination, with an upper reciprocating needle, of a rotary-turret, a curved needle pivotally carried by said turret, a looper mounted on said turret for loop-seizing and sidewise movements, a vertically movable actuator, a link connection between said actuator and the curved needle, a pair of driving cranks with connections for imparting a dwell to said actuator during the first part of its down-stroke, and other connections including a toggle device between said actuator and the looper for imparting a dwell to the latter when the actuator is near the lower end of its stroke.

10. In a buttonhole sewing machine, in combination, a rotary-turret, a curved needle, a needle-carrier mounted on said turret for movement in a curved path, a pitman connected to said needle-carrier, a shaft carrying two crank-elements, and independent driving connections between said crank-elements and said pitman.

11. In a buttonhole sewing machine, in combination, a rotary-turret, a curved needle, a needle carrier mounted on said turret for movement in a curved path, a shaft carrying a pair of rotary crank-elements, and operative connections between said crank-elements and said needle-carrier for imparting a dwell to the latter during the first part of its down-stroke.

12. In a buttonhole sewing machine, in combination, a rotary-turret, a curved needle, a needle-carrier mounted on said turret for movement in a curved path, a pitman connected to said needle-carrier, a shaft carrying two crank-elements, and a pair of links connecting said crank-elements with said pitman.

In testimony whereof, I have signed my name to this specification.

ALBERT H. DE VOE.